Oct. 14, 1952     J. C. LOKEN     2,613,902
TRIPOD LEG CONNECTION
Filed Jan. 21, 1948
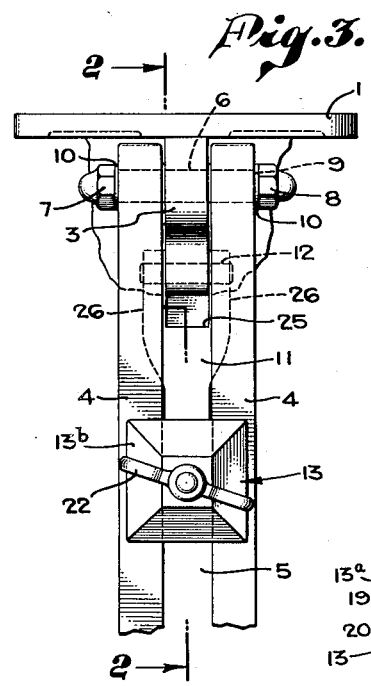
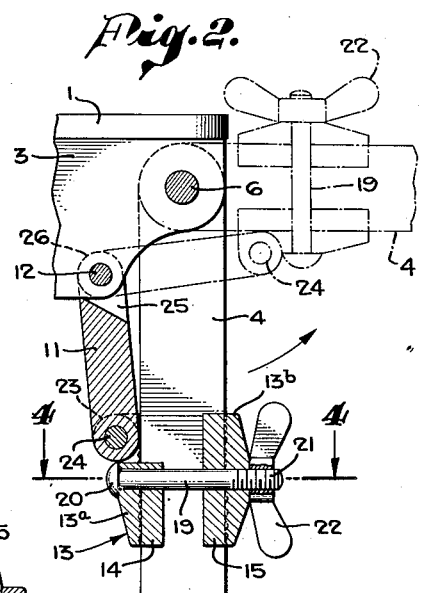
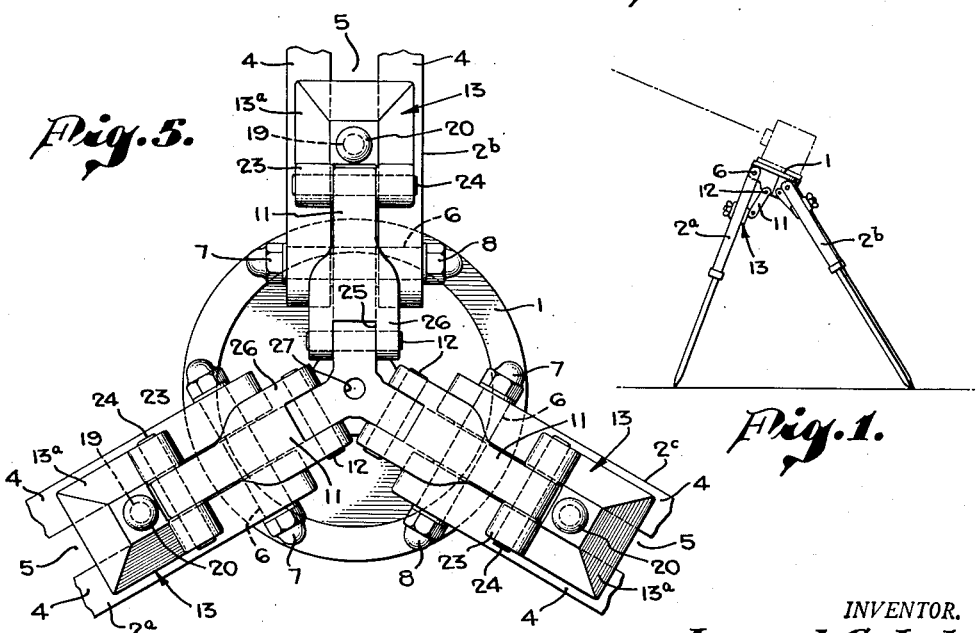
INVENTOR.
Jenard C. Loken
BY Francis D. Ammen
his ATTORNEY Patented Oct. 14, 1952

2,613,902

UNITED STATES PATENT OFFICE 2,613,902

TRIPOD LEG CONNECTION

Jenard C. Loken, Inglewood, Calif.

Application January 21, 1948, Serial No. 3,620

3 Claims. (Cl. 248—192)

This invention is especially adapted for incorporation into a frame, such as a camera tripod. A camera tripod frame usually includes a plate, or platen, having means enabling it to function as a seat for a camera, and is usually provided with three equally spaced legs that are pivotally attached to the plate, and support it at its under side. In taking pictures with a camera, it is frequently necessary to hold the camera in a tilted position so that the axis of the lens assembly is not disposed in a horizontal position, but is tilted sometimes to an extreme inclined angle. This of course makes it necessary to provide a construction which will enable the platen to be tilted into an inclined position and held there rigidly. It is usual to attach the legs at the under side of the plate or platen, by a pivotal connection, and many devices have been suggested heretofore for holding the legs securely in different angular positions with respect to their axis of rotation on their pivotal connections to the platen.

One of the objects of this invention is to provide an improved connection between the camera leg and the platen, which will function to hold the leg securely in any adjusted position about its axis of rotation on the platen, and which, at the same time, will have a relatively great angle of swing about that axis. This latter feature greatly increases serviceability of the camera tripod when it is necessary to set it up to "shoot" a scene in which the axis of the lens assembly must be tilted to a considerable angle from the horizontal; and when the camera must be supported very near the ground level.

Further objects of the invention will appear hereinafter.

The invention consists in the novel parts and combinations of parts to be described hereinafter, all of which contribute to produce an efficient tripod leg connection.

A preferred embodiment of the invention is described in the following specification, while the broad scope of the invention is pointed out in the appended claims.

In the drawing:

Fig. 1 is a side elevation of a camera tripod embodying my invention, and illustrating the same with its legs secured in such a way as to enable the axis of the lens assembly to be tilted to a considerable angle from the horizontal. In this view the camera is illustrated in dotted lines.

Fig. 2 is a vertical section showing the upper portion of a leg of the tripod, with the lower portion broken away. This view is taken on the line 2—2 of Fig. 3, and shows a portion of the periphery of the platen in side elevation, broken away, while the lower portion of the view shows the parts in section as they would appear when the section is taken on a vertical medial plane through the leg. And in this figure, dotted lines show the leg in an extreme position as though clamped up, so that the leg is extending in a plane substantially parallel with the upper face of the platen.

Fig. 3 is an elevation showing the parts illustrated in Fig. 2, as though viewed from the right side. In this view the other legs of the tripod and their connections to the tripod, are omitted for the sake of clearness.

Fig. 4 is a horizontal section taken on the line 4—4 of Fig. 2, further illustrating details of a clamping means that I prefer to employ as part of the connection between the leg and the platen.

Fig. 5 is a bottom plan view upon an enlarged scale, and illustrating the platen as viewed from its under side, with the three legs of the tripod extended into a substantially horizontal plane.

In accordance with my invention I provide pivots for the legs of the tripod located below, and supported on, the platen that supports the camera. I also provide relatively short links each of which is pivotally supported at its upper end by the platen a short distance below the level of the platen. Between each link and its corresponding leg I provide an adjustable connection including a slide that is guided to slide along one of the parts, and I provide a pivotally connection on the slide connecting to the other of these parts. That is the way I connect each link to each leg. This organization of parts gives great freedom of movement of each leg of the tripod when adjusting it upward at its foot.

Referring more particularly to the parts, 1 indicates the camera tripod head or platen of the tripod, and this platen is of circular form, and provided on its under side with means for effecting a pivotal connection to the three legs 2a, 2b, and 2c, of the tripod. In order to effect this pivotal connection, I prefer to provide the under side of the platen 1, with integral substantially radially extending fins 3. In practice, the platen 1 would be usually made of metal, and the fins 3 would be cast integral with its body. Each of the tripod legs is preferably bifurcated so that its upper end presents two forks 4 with a space 5 between them, which space is sufficiently large to enable the forks to be applied over the fins 3 and secured to the fins by a pivot bolt 6. This is a through bolt with a head 7 on one end and a nut 8 on the other end. However, these bolts have shoulders at the points 9, against which their washers 10 seat under the head 7 and the nut 8. This arrangement prevents the bolts from operating as clamps. In this connection, it should be understood that this pivotal connection at the bolt 6, is a free connection, as the securing of the leg is accomplished by means operating independently of this pivot.

In accordance with my invention, I provide a link 11 corresponding to each leg, and the upper or inner end of this link is pivotally connected to its corresponding fin 3 by a suitable pivot pin or bolt 12. The outer or lower end of this link has a sliding or pivotal slot connection to the forks 4, and if the legs are bifurcated as indicated, the space 5 is utilized as a slot in which clamping means is provided for clamping the outer or lower end of the link to the leg.

While this connection may be accomplished by employing a bolt pivotally connected to the link and extending outwardly through the slot in the leg, and provided with means for clamping the bolt in any desired position, I prefer to employ a runner or slide 13 that runs along in the slot 5. This slide as illustrated, preferably includes an inner cap 13a and an outer cap 13b. These caps operate as saddles sliding along on the inner and outer faces of the legs, and include abutments 14 and 15 on their inner faces, that have flat side faces that fit against the inner faces 16 of the forks; that is to say, they slide against the inner faces 17 of the forks, which constitute the sides of the slots 5. As shown most clearly in Fig. 4, the bodies of the caps 13a and 13b are preferably formed with scored faces 18, that lie against the inner and outer sides of the legs.

Any suitable clamping means may be provided for drawing these caps 13a and 13b toward each other to clamp them on the leg in any adjusted position the leg may assume around its pivot bolt 6. In the present instance, I have illustrated the use of a through bolt 19 having a head 20 on one end, and having a shank with a threaded tip 21 carrying a wing nut 22. When these two nuts are loosened, the slides 13 will slide freely on the legs, and when they are tightened, they will hold the clamps or runners 13 securely on the legs to keep the legs from moving about their pivot bolts.

The inner caps 13a are each provided with lugs 23 spaced apart to receive the lower ends of the links between them, and this connection is completed by providing a through bolt or pin 24 that extends through these lugs and the lower ends of the links, respectively.

The upper end of each link 11 is formed with a recess 25 near its medial plane, between two ears 26. These ears 26 lie against the side faces of the fin, respectively, and the pivot bolts 12 already described, pass through these ears and the fin so as to complete the pivotal connection between the links and the fin. This connection is illustrated clearly in Fig. 5, and should be read in connection with Fig. 2. As will be noted in Fig. 5, the ears 26 are offset outwardly from the body of the link.

Referring again to Fig. 2, it will be noted that I place the pivot pins 12 a considerable distance below the level of the pivot bolts 6 that attach the legs to the platen. This is most advantageous because it develops clearance space for the bodies of the links below the outer ends of the fins 3, and this enables the legs to be swung way up on their pivot bolts 6 to a substantially horizontal position, such as that indicated in dotted lines in Fig. 2. This feature of my invention, enables the camera to be supported when desired, not only in a tilted position such as illustrated in Fig. 1, but also enables the camera to be supported when desired, in a horizontal position very near the ground level. Sometimes it is necessary to take a picture with the camera in a horizontal position, and at a low level. In order to enable the legs to have this extreme swinging movement, the clearance recesses 25 may be made much longer on their outer sides than inner sides as indicated in the longitudinal section of the link 11 illustrated in Fig. 2.

It will now be evident that in accordance with my invention the legs of the tripod are independent of each other in their adjustability about their pivotal connections 6. Furthermore, when a leg of the tripod is secured in any intermediate position between the vertical position, and the horizontal position indicated in dotted lines in Fig. 2, the three pivotal connections 6, 12, and 24 located as they are a considerable distance apart, cause the longitudinal axis of the link 11 to form a considerable angle with the longitudinal axis of the leg to which it is attached. This effect is enhanced by reason of the fact that the pivotal connection 12 is located slightly below the level of the pivotal connection 6, and is disposed inwardly toward the central axis of the platen. And in attaining this effect the fact that the length of the link 11 is of the same order as the distance between the pivotal connections 6 and 12, operates to develop a relatively great degree of inclination in the link with respect to the longitudinal axis of the leg. The use of this link 11 connecting to the under side of the platen located on a vertical line between the pivot 6 and the vertical axis of the platen, and adjacent to the pivot 6, makes it unnecessary to employ any other connecting links for the legs. My invention makes it possible to set the tripod up as indicated in Fig. 1, by making a single adjustment for the link that is associated with the rear leg 2b.

The platen 1 is provided with the usual central opening 27 for a clamping bolt (not illustrated), that secures the camera to the platen.

Many other embodiments of the invention may be resorted to without departing from the spirit of the invention.

I claim as my invention:

1. In a frame for supporting a camera or the like, a platen having means thereon for securing a camera, said platen having a substantially radially extending fin on its under side, a bifurcated leg, the forks whereof lie on opposite sides of the fin, a pivot bolt securing the ends of the forks to said fin, a link pivotally attached to the fin, a slide on the leg having an inner jaw pivotally connected to the link, and having an outer jaw on the outer side of the leg, and means for drawing the jaws toward each other to clamp the slide to the leg, including a part running in the space between the forks of the leg.

2. A frame according to claim 1, in which the pivotal connection between the link and the fin is located at a sufficiently low level below the pivotal connection between the leg and the fin to enable the leg to swing up to a substantially horizontal position when the platen is substantially horizontal.

3. In a tripod for a camera or the like, the combination of supporting legs bifurcated at their upper ends so as to present two spaced forks, a camera-mounting platen having circumferentially spaced members to which said bifurcated ends of said legs are pivotally secured, links pivoted at their upper ends to each of said circumferentially spaced members, a slide member mounted to slide between the forks of each leg, the lower end of each of said links being pivotally secured to one of said slide members; and means for effecting a releasable clamping engagement of each of said slide members with the forks of said legs.

JENARD C. LOKEN.

REFERENCES CITED

The following references are of record in the file of this patent:

UNITED STATES PATENTS

| Number | Name | Date |
|---|---|---|
| 2,160,538 | Cavuoti | May 30, 1939 |
| 2,282,285 | Olson | May 5, 1942 |